United States Patent
Tibble et al.

(10) Patent No.: US 9,619,224 B2
(45) Date of Patent: *Apr. 11, 2017

(54) AGGREGATING SOURCE CODE METRIC VALUES

(71) Applicant: SEMMLE LIMITED, Oxford (GB)

(72) Inventors: Julian Tibble, Oxford (GB); Pavel Avgustinov, Oxford (GB); Yorck Huenke, Oxford (GB); Arthur Baars, Oxford (GB)

(73) Assignee: Semmle Limited, London (DE)

( * ) Notice: Subject to any disclaimer, the term of this patent is extended or adjusted under 35 U.S.C. 154(b) by 84 days.

This patent is subject to a terminal disclaimer.

(21) Appl. No.: 14/794,227

(22) Filed: Jul. 8, 2015

(65) Prior Publication Data

US 2015/0347126 A1    Dec. 3, 2015

Related U.S. Application Data

(63) Continuation of application No. 14/292,697, filed on May 30, 2014, now Pat. No. 9,098,377.

(51) Int. Cl.
    *G06F 9/44*        (2006.01)
    *G06F 11/36*      (2006.01)

(52) U.S. Cl.
    CPC ............... *G06F 8/70* (2013.01); *G06F 8/75* (2013.01); *G06F 8/77* (2013.01); *G06F 11/3688* (2013.01)

(58) Field of Classification Search
    CPC ........................................................ G06F 8/70
    USPC ................................................. 717/124–161
    See application file for complete search history.

(56) References Cited

U.S. PATENT DOCUMENTS

| | | | |
|---|---|---|---|
| 4,845,615 | A | 7/1989 | Blasciak |
| 5,103,394 | A | 4/1992 | Blasciak |
| 5,448,737 | A | 9/1995 | Burke et al. |
| 6,751,663 | B1 | 6/2004 | Farrell et al. |
| 7,263,694 | B2 | 8/2007 | Clewis et al. |
| 7,412,430 | B1 | 8/2008 | Moore |
| 7,509,414 | B2 | 3/2009 | Agarwal et al. |

(Continued)

OTHER PUBLICATIONS

Grottke, Michael, and Kishor S. Trivedi. "Fighting bugs: Remove, retry, replicate, and rejuvenate." Computer 40.2 (2007): pp. 107-109.*

(Continued)

*Primary Examiner* — Satish Rampuria
(74) *Attorney, Agent, or Firm* — Fish & Richardson P.C.

(57) ABSTRACT

Methods, systems, and apparatus, including computer programs encoded on computer storage media, for aggregating source code metric values. One of the methods includes obtaining data representing a directed graph, wherein one or more nodes of the graph are associated with a respective set of one or more metric instances, wherein each set of metric instances for each node includes all metric instances occurring in sets of any node descendant from the node in the graph, wherein each metric instance identifies a location in a source code base, and wherein each metric instance has a respective metric value, a respective identifier, and a respective attribute type. An attribute value is computed for a first node in the graph from the respective metric value of each metric instance in a first set of metric instances associated with the first node.

17 Claims, 8 Drawing Sheets

(56) References Cited

U.S. PATENT DOCUMENTS

| | | | |
|---|---|---|---|
| 7,739,666 B2 | 6/2010 | Zhu et al. | |
| 8,296,312 B1 | 10/2012 | Leung et al. | |
| 8,347,272 B2 | 1/2013 | Sugawara et al. | |
| 8,468,502 B2 * | 6/2013 | Lui | G06F 11/3612 717/125 |
| 8,875,145 B2 | 10/2014 | Atterbury et al. | |
| 8,881,293 B1 * | 11/2014 | Brucker | G06F 21/577 717/126 |
| 2002/0062463 A1 | 5/2002 | Hines | |
| 2007/0162903 A1 | 7/2007 | Babb et al. | |
| 2008/0271006 A1 * | 10/2008 | Nagappan | G06F 11/3616 717/162 |
| 2010/0162215 A1 | 6/2010 | Purcell et al. | |
| 2010/0293519 A1 | 11/2010 | Groves et al. | |
| 2012/0036463 A1 | 2/2012 | Krakovsky et al. | |
| 2012/0272220 A1 * | 10/2012 | Calcagno | G06F 8/77 717/125 |
| 2012/0304153 A1 * | 11/2012 | Li | G06F 8/75 717/123 |
| 2013/0074059 A1 | 3/2013 | Emani et al. | |
| 2014/0189665 A1 | 7/2014 | Hong et al. | |
| 2014/0304402 A1 | 10/2014 | Prakash et al. | |

OTHER PUBLICATIONS

Smaragdakis, Yannis, and Christoph Csallner. "Combining static and dynamic reasoning for bug detection." International Conference on Tests and Proofs. Springer Berlin Heidelberg, 2007. pp. 2-16.*

Antunes, Nuno, and Marco Vieira. "Comparing the effectiveness of penetration testing and static code analysis on the detection of sql injection vulnerabilities in web services." Dependable Computing, 2009. PRDC'09. 15th IEEE Pacific Rim International Symposium on. IEEE, 2009. pp. 301-306.*

Abi-Antoun et al., "Are object grapsh extracted using abstract interpretation significantly different from the code?," IEEE, 2014, 14th International Working Conference on Source Code Analysis and Manipulation, pp. 245-254.

Bartoszuk et al., Magnify—a new tool for software visualization, IEEE, 2013, Proceedings of the 2013 Federated Conference on Computer Science and Information Systems, pp. 1485-1488.

Extended European Search Report in EP Application No. 15169679. 6, dated Oct. 20, 2015, 9 pages.

Sawin et al., Assumption Hierarchy for a CHA Call Graph Construction Algorithm, IEEE, 2011, 11$^{th}$ IEEE International Working Conference on Source Code Analysis and Manipulation, pp. 35-44.

* cited by examiner

AGGREGATING SOURCE CODE METRIC VALUES

CROSS-REFERENCE TO RELATED APPLICATIONS

This application is a continuation application of, and claims priority to, pending U.S. patent application Ser. No. 14/292,697, filed on May 30, 2014, entitled "Aggregating Source Code Metric Values". The disclosure of the foregoing application is incorporated herein by reference in its entirety.

BACKGROUND

This specification relates to static analysis of computer software source code.

Static analysis refers to techniques for analyzing computer software source code without executing the source code as a computer software program.

SUMMARY

This specification describes how a static analysis system can compute attribute values for particular portions of a code base by aggregating metric values of metric instances according to a graph structure.

In general, one innovative aspect of the subject matter described in this specification can be embodied in methods that include the actions of obtaining data representing a directed graph, wherein one or more nodes of the graph are associated with a respective set of one or more metric instances, wherein each set of metric instances for each node includes all metric instances occurring in sets of any node descendant from the node in the graph, wherein each metric instance identifies a location in a source code base, and wherein each metric instance has a respective metric value, a respective identifier, and a respective attribute type; and computing, for a first node in the graph, an attribute value for the first attribute from the respective metric value of each metric instance in a first set of metric instances associated with the first node. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. The actions include receiving, from a user, a request for an attribute value for the first node; and providing the computed attribute value for the first node to the user in response to the request.

In general, another innovative aspect of the subject matter described in this specification can be embodied in methods that include the actions of obtaining data representing a directed graph, the graph having leaf nodes and parent nodes, wherein one or more nodes of the graph are associated with one or more respective metric instances, each metric instance being associated with one or more files or directories of a source code base, wherein each metric instance has a respective metric value, a respective identifier, and a respective attribute type; computing, for each parent node in the graph, a respective set of metric instances having a first attribute type, each respective set of metric instances identifying metric instances associated with the parent node and all metric instances associated with any node descendant from the parent node in the graph; and computing, for a first parent node, an attribute value for the first attribute type from the respective metric value of each metric instance in a first set of metric instances computed for the first parent node. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The actions include receiving, from a user, a request for an attribute value associated with the first parent node; and providing the computed attribute value for the first parent node to the user in response to the request. Providing the computed attribute value for the first parent node to the user in response to the request comprises providing a presentation of the graph, the presentation including a graphical representation of the first parent node and the computed attribute value associated with the first parent node. The graph has a particular node that is reachable by multiple paths in the graph, and wherein the actions include computing, for each parent node in the graph, the respective set of metric instances comprises including all metric instances identified by a particular set of metric instances associated with the particular node in each respective set of metric instances associated with each parent node of the particular node. The graph includes multiple organizational nodes and multiple edges, each organizational node representing a respective business entity of a business organization, each edge between organizational nodes representing responsibility of a first business entity for a second business entity. The graph includes multiple file system nodes, wherein each edge between an organizational node and a file system node represents responsibility of a business unit represented by the organizational node for a part of the code base represented by the file system node. The metric instances include a first metric instance that is associated with two or more locations in the code base. The graph represents a structure of a file system of the code base, each node representing a file or a directory of the code base, wherein each edge between file system nodes represents directory inclusion of a file or directory represented by a first file system node in a directory represented by a second file system node.

Particular embodiments of the subject matter described in this specification can be implemented so as to realize one or more of the following advantages. Instances of source code metrics that are associated with multiple locations in a code base can be correctly aggregated to give attribute values for particular portions of a code base. A system can also correctly aggregate shared metrics that are associated with nodes of a graph that are reachable by multiple paths. Aggregated metric values can be presented with a display graph that provides an intuitive presentation of quantified information about the attributes of different portions of a code base. A system can correctly aggregate metric values for a display graph that represents an arbitrary graph of responsibilities in an organization—responsibility both for other units of the organization and other parts of the code base. Associating metric instances with nodes in the display graph can result in lower latency for computing aggregated metric values for complex display graphs.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Static analysis can be performed on a code base, which may be referred to as a project. A project generally includes a collection of source code files organized in a particular way, e.g., arranged in a hierarchical directory structure, with each source code file in the project having a respective path.

A static analysis system can generate metrics for source code in a project. A metric is a measurement of an attribute of a portion of, or the entirety of, the source code.

A metric instance has a value, which quantifies the measurement of the attribute. For example, the attribute "cyclomatic complexity" for a particular source code function can have a value of 10; or, the attribute "lines of code" for the source code files in a particular directory can have a value of 3,146.

Each metric instance is associated with one or more locations in a project. The locations specify the part or parts of the source code for which the metric is a measurement. For example, a metric for the attribute "cyclomatic complexity" of a function has a metric instance that is associated with a location in the project where the function is defined and a possibly different location where the function is declared. A metric for the attribute "number of duplicate functions," which is a count of the number of functions in some portion of the source that have a duplicate somewhere in the project, has a metric instance for each function that has one or more duplicates, and each metric instance has the locations of the function and all the duplicate functions in the project.

A static analysis system can obtain attribute values for source code in a particular portion of a project by computing aggregated metric values. For example, a system can compute a value for the attribute "number of lines of code" for a particular source code directory by summing the metric values of all metric instances that are associated with source code files in the directory. Other types of aggregated metric values include a count, a minimum, a maximum, an arithmetic mean, a geometric mean, a median, a mode, or any other appropriate measure of central tendency of metric values associated with a particular portion of a project.

A system can represent a metric instance using a metric data element. The following example metric data element represents a measure of cyclomatic complexity of a particular source code function in a code base:

(
id:a,
type:cyclomatic complexity,
value:35,
locations:{(/usr/src/lib.c,254,10), (/usr/src/lib.h,29,10)}
)

The identifier of the metric instance is "a"; the attribute type is "cyclomatic complexity"; and the value is 35. The metric instance is associated with two locations: /usr/src/lib.c, line 254, offset 10; and /usr/src/lib.h, line 29, offset 10.

Locations of metric instances are typically specified by a path of a source code file, as well as a start position within the source code file. The location within the source code file may also include an end position. Typically, the start and end positions within a file are represented by starting and ending line numbers within the file as well as an optional offset within the line, e.g., a column number or an offset that specifies a number of characters or bytes away from the start of a line. The start and end positions can also be given by a character or a byte offset within a source code file as a whole, for example, "/usr/src/lib.c, offset 335." Additionally, rather than an absolute end position, the end position can be specified as an offset from the start position.

Aggregating metric values typically involves computing aggregate metric values of metric instances that have a same attribute type. In the examples below, when an attribute type is not mentioned, it will be assumed for simplicity that aggregation is performed on metric values of metric instances having a same attribute type. However, some aggregated metric values are computed using aggregated metric values of different types. For example, an arithmetic mean of lines of code in source code files in a project can be computed using a first aggregated metric value of the total lines of source code in the project and a second aggregated metric value of the total number of source code files in the project.

Figure 1A:
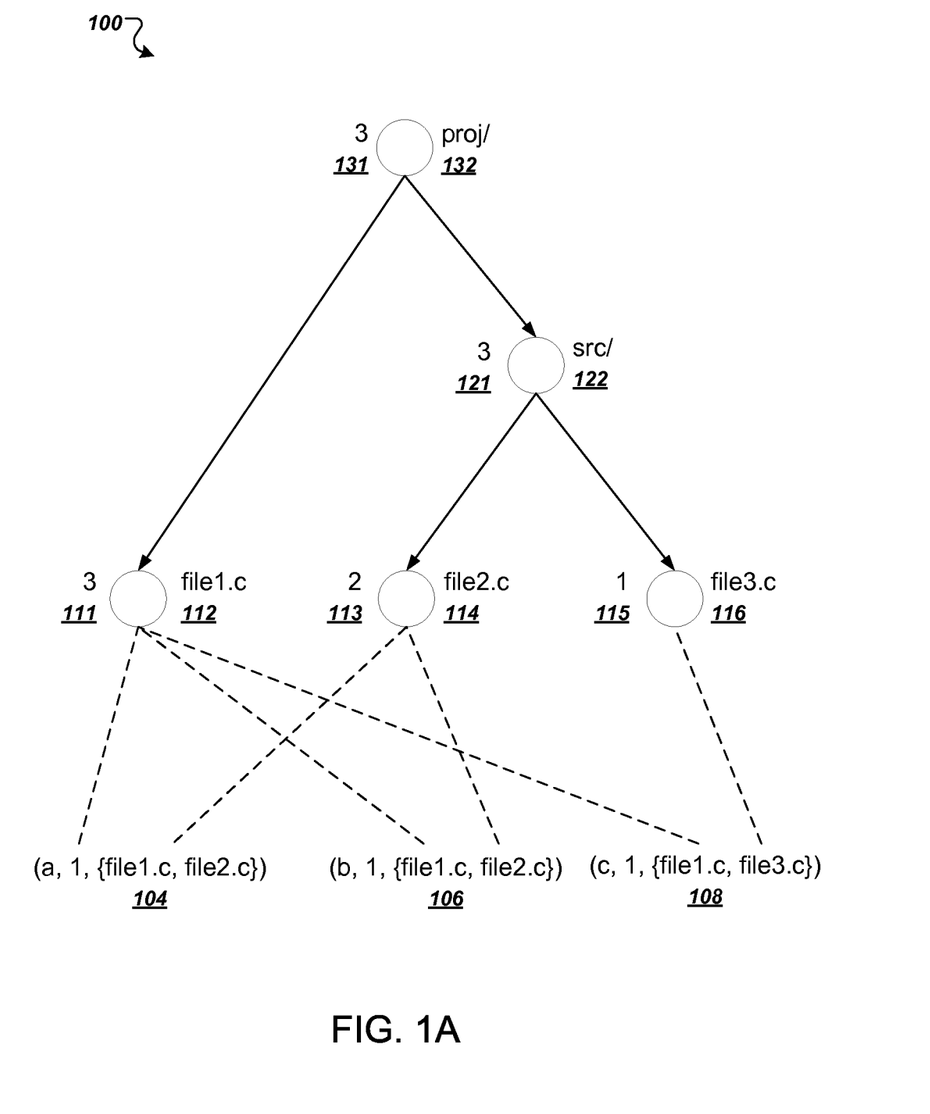
FIG. 1A illustrates attribute values associated with multiple portions of a project.

FIG. 1A illustrates attribute values associated with multiple portions of a project. The organization of source code files in the project is represented as a graph 100, where each node represents a file or a directory, and edges between the nodes represent directory inclusion.

Each of the metric data elements 104, 106, and 108 represents a duplicate function within the project. The metric data element 104 represents a metric instance having a value of 1 and being associated with two locations in the project, "file1.c," and "file2.c." Similarly, the metric data element 106 represents a metric instance having a value of 1 and being associated with, "file1.c," and "file2.c," and the metric data element 108 represents a metric instance having a value of 1 and being associated with "file1.c," and "file3.c." For brevity, line and column information have been omitted from the locations.

The attribute value 111 of the attribute "duplicate functions" for the source code file node "file1.c" 112 is 3 because the file "file1.c" includes three duplicate functions. A system can compute the attribute value 111 by aggregating the metric values of all metric instances associated with the node 112 representing "file1.c." Thus, the system can compute the sum of the values of metric data elements 104, 106, and 108, which is 3. Similarly, the attribute value 113 for the source code file node "file2.c" is 2, and the attribute value 115 for the source code file node "file3.c" is 1.

The attribute value 121 of the attribute "duplicate functions" for the directory node "src/" 122 is 3. The attribute value 121 is 3 because there are three duplicate functions in the "src/" directory, each being represented by one of the three metric data elements 104, 106, and 108.

The attribute value 131 of the attribute "duplicate functions" for the directory node "proj/" 132 is also 3 because there are three duplicate functions in the "proj/" directory. The attribute value 131 is not obtained by merely summing the attribute values of child nodes. Rather, the attribute value 131 must be aggregated in a particular way, which will be described in more detail below.

To avoid aggregation errors, a user or a system may select only particular attribute types for aggregation. In particular, the metric values for a particular attribute type should not represent aggregations of metric values for the same attribute type. For example, a first metric instance can have a metric value that represents a number of statements in a method, and a second metric instance can have a metric value that represents a number of statements in a class that includes the method. The two example metric instances have the same attribute type, "number of statements," and the second metric instance has a value that represents an aggregation of metric values associated with the first metric. Thus, a user or a system should select only the first metric for aggregation and not the second metric.

A static analysis system can aggregate metric values of metric instances in a code base according to a directed graph structure that represents an organization of source code files in the code base. The graph structure can be used to present a user with attribute values in an intuitive way. For example, the system can generate a user interface that presents a graphical representation of the graph structure, with attribute values being displayed with each node of the graph structure.

The user can interact with the user interface to navigate to various nodes of the graph structure, which can allow the user to view attribute values of various attributes associated with corresponding parts of the code base. Thus, in this specification, the graph structure that includes nodes having associated attribute values will be referred to as a display graph. However, the display graph need not be actually displayed on a particular device or otherwise presented to a user.

The structure of a display graph can represent any appropriate organization of source code files in the code base. For example, the structure can represent a file system of the code base. File system nodes can represent files and directories, and edges between file system nodes can represent directory inclusion.

The structure of the display graph can also represent a structure of a business organization. Organizational nodes can represent business entities, e.g., units or subunits of the business organization, and edges of the display graph can represent full or partial responsibility of one unit for another unit. Organizational nodes may also represent team membership of distinct teams and subteams of individuals. For example, a parent node can represent a managerial team, and sibling nodes descendant from the parent node can represent teams of developers. The edges to the nodes representing teams of developers can represent reporting responsibility to the managerial team represented by the parent node.

Business subunits may have responsibility to multiple business units, and teams may be managed by multiple managers. Thus, the display graph for a business organization need not have a tree structure. In other words, a particular node in the display graph may be reachable by multiple paths in the display graph.

The display graph can also include multiple types of nodes and edges. For example, the display graph can include both organizational nodes and file system nodes, where the edges represent either responsibility or directory inclusion. In particular, an edge between an organizational node and a file system node can represent that the business unit represented by the organizational node has some responsibility for a part of the code base represented by the file system node. If the file system node represents a directory, the edge between the organizational node and the file system node can indicate that the business unit has responsibility for all source code files represented by nodes descendant from the directory node, i.e., all nodes reachable from the directory node by following the directed edges of the display graph.

Figure 1B:
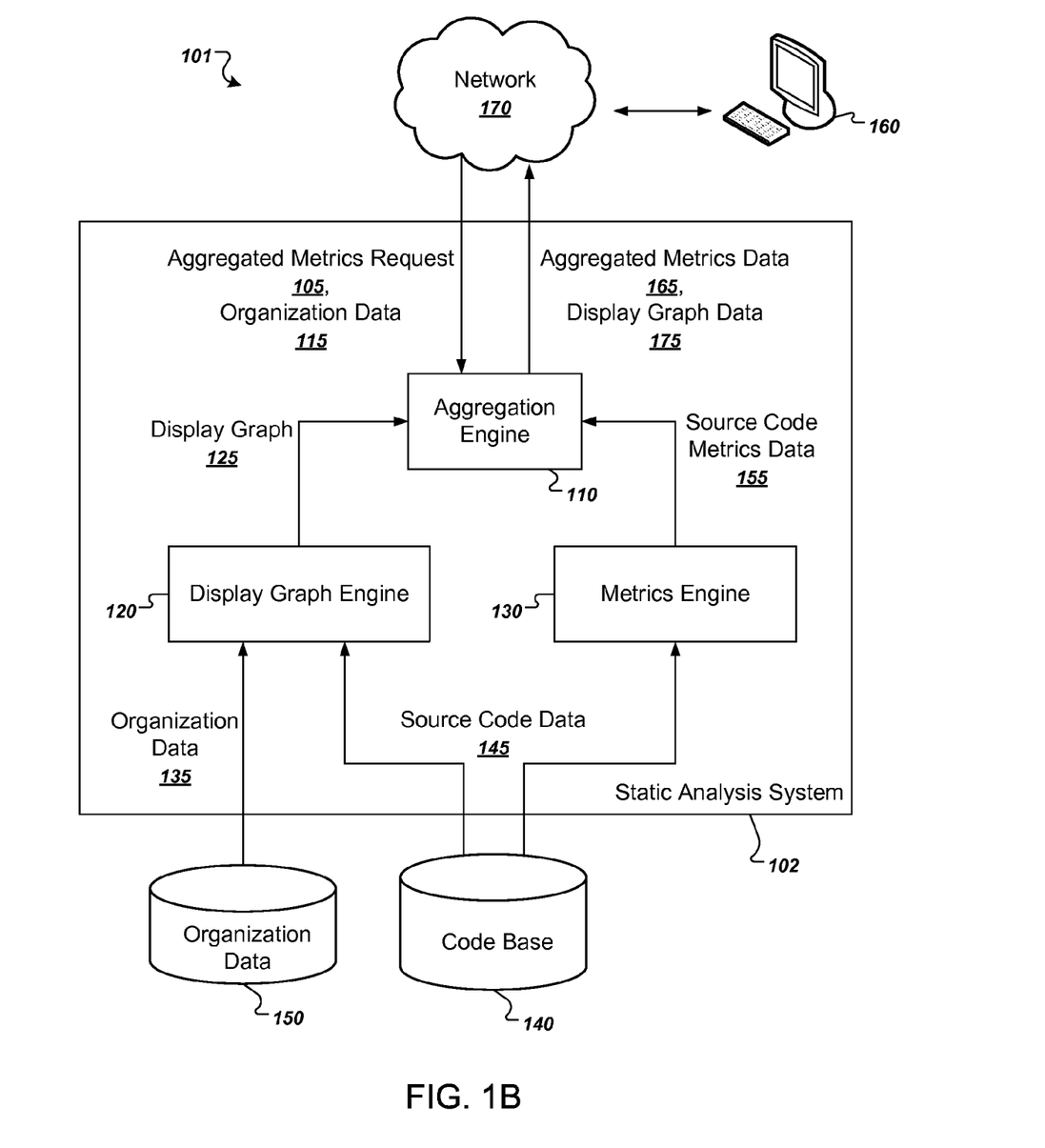
FIG. 1B illustrates an example system.

FIG. 1B illustrates an example system 101. The system 101 includes a user device 160 in communication with a static analysis system 102 over a network 170, which can be any appropriate communications network. The static analysis system 102 includes an aggregation engine 110, a display graph engine 120, and a metrics engine 130. The components of the static analysis system 102 can be implemented as computer programs installed on one or more computers in one or more locations that are coupled to each through a network. Alternatively, the static analysis system 102 can be installed in whole or in part on a single computing device, e.g., the user device 160.

A user of user device 160 can interact with the static analysis system 102 to obtain aggregated metrics data 165 about the code base 140 and display graph data 175. The user device 160 can communicate with the static analysis system 102 over the network 170. For example, a user of user device 160 can provide an aggregated metrics request 105 that identifies the code base 140.

A user of user device 160 can also communicate with the static analysis system 102 in order to provide organization data 115 that specifies responsibilities of business units for each other and for particular parts of the code base 140.

The display graph engine 120 generates and maintains a display graph 125. The display graph engine 120 receives organization data 135 from a collection 150 of organization data and receives source code data 145 from a code base 140. The display graph engine 120 can generate the nodes and edges of the display graph 125 based on this information. The display graph engine 120 can then provide the display graph 125 to the aggregation engine 110.

The metrics engine 130 receives source code data 145 from the code base 140, which includes source code files. The metrics engine then computes metrics for a variety of attributes on the source code data 145. The metrics engine 130 can provide the computed source code metrics data 155 to the aggregation engine 110. Alternatively, the static analysis system 102 can obtain source code metrics data 155 from another source without computing the metrics using a metrics engine 130.

The aggregation engine 110 receives the display graph 125 and the source code metrics data 155 and computes attribute values for various portions of the code base by aggregating metric values specified in the source code metrics data 155 according to the structure of the display graph 125. This will be described in more detail below.

The aggregation engine 110 then provides aggregated metrics data 165 to the user device 160. The aggregation engine 110 can also provide display graph data 175, e.g., a presentation of the display graph 125, for display at the user device 160.

The user device may interactively query the aggregation engine 110 with aggregated metrics requests 105 for different parts of the display graph 125. For example, the user can navigate the display graph in real time and drill down to various nodes of the display graph. At each node, the user can request a particular attribute value for the node.

The aggregation engine 110 can precompute the aggregated metrics data 165 for all parts of the display graph 125. However, precomputing all the aggregated metrics data 165 may not be feasible for very large code bases. Thus, the aggregation engine 110 may alternatively compute some of the aggregated metrics data 165 in response to a request. In other words, the aggregation engine 110 may compute the aggregated metrics data 165 for only a particular portion of the display graph 125 and only after the aggregated metrics request 105 is received.

Figure 2:
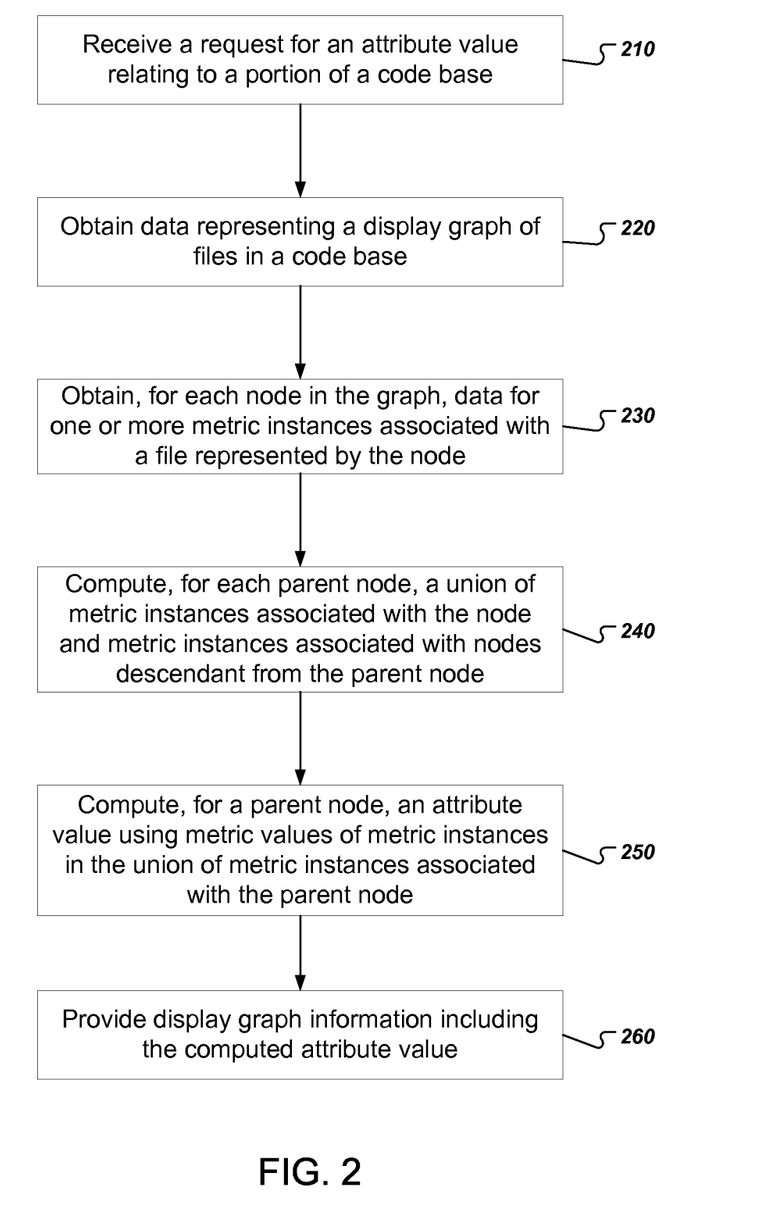
FIG. 2 illustrates an example process for aggregating metric values for metric instances associated with multiple locations in a code base.

FIG. 2 is an example process for aggregating metric values for metric instances associated with multiple locations in a code base. In general, a system can aggregate metric values by associating each node in the display graph with a set of metric instances that are associated with locations in the code base descendant from the node. The process can be performed by one or more computer programs installed on one or more computers. The process will be described as being performed by an appropriately programmed system of one or more computers, e.g., the aggregation engine 110 of FIG. 1.

The system receives a request for an attribute value relating to a portion of a code base (210). For example, the system can receive a request from a user, who may be navigating a graphical representation of a display graph from a user device in communication with a static analysis system. The system can determine the nodes of the display graph that will be presented to the user and then compute attribute values for those nodes as appropriate. Alternatively, the user can provide a request for an attribute value for a particular portion of the code base, e.g., an attribute value for a particular source code file or directory.

The system obtains data representing a display graph of files in a code base (220). The display graph may, for example, represent the structure of files and directories of a file system of a code base.

Figure 3A:
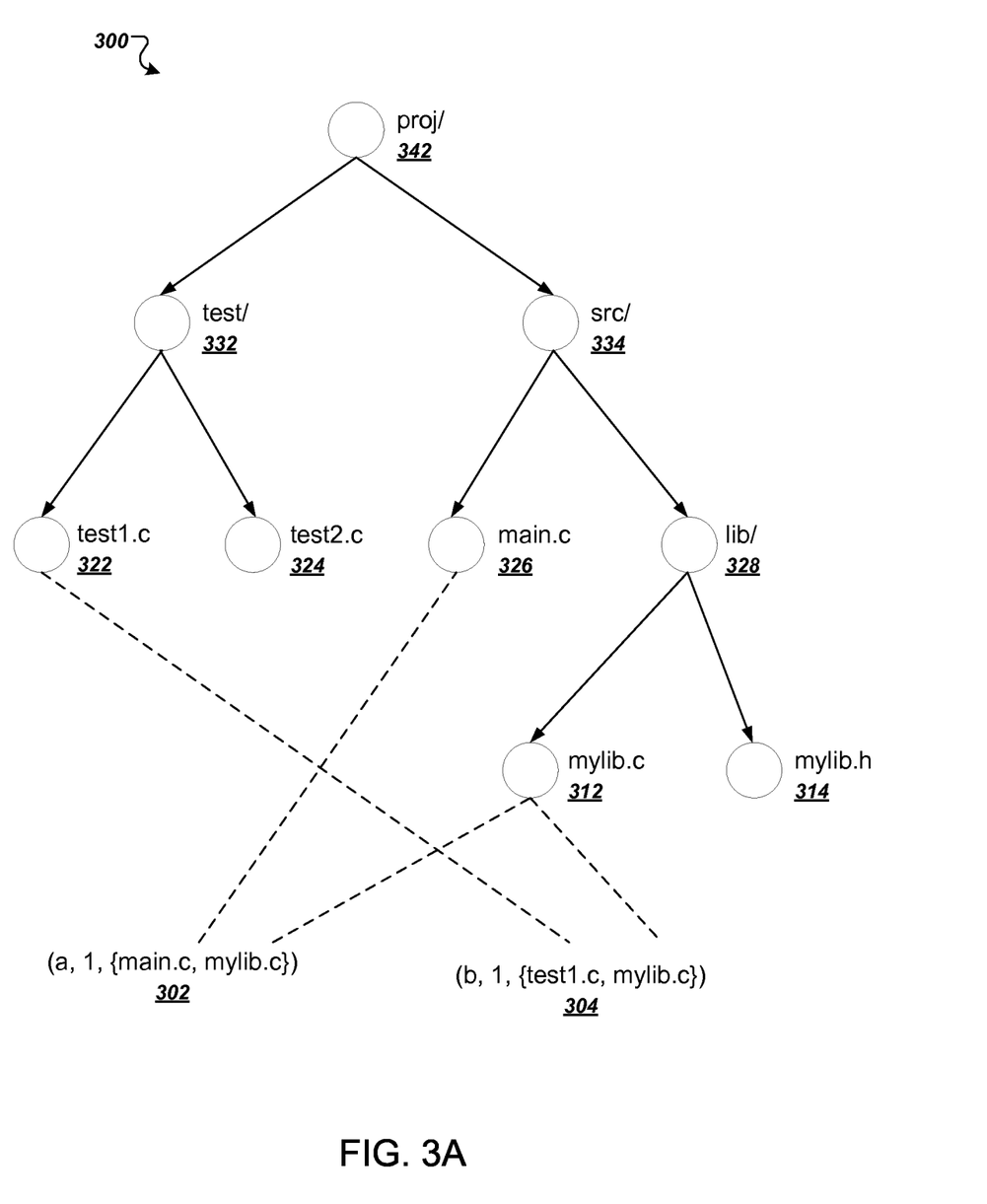
FIG. 3A illustrates an example display graph for a file system.

FIG. 3A illustrates an example display graph for a file system. The display graph 300 represents the structure of a file system. The "proj/" node 342 represents a directory in the file system of the code base that includes directories represented by the "test/" node 332 and the "src/" node 334. The "test/" node 332 represents a directory that includes source code files represented by the "test1.c" node 322 and the "test2.c" node 324. The "src/" node 334 represents a directory that includes the source code file represented by the "main.c" node 326 and a directory represented by the "lib/" node 328. The directory represented by the "lib/" node 328 includes files represented by the "mylib.c" node 312 and the "mylib.h" node 314.

As shown in FIG. 2, the system obtains, for each node in the graph, data for one or more metric instances associated with a file represented by the node (230). The system may also obtain data for metric instances that are associated with directories of the code base for nodes in the display graph that represent directories.

As shown in FIG. 3A, a static analysis system has associated two metric instances with source code files in the code base. In this example, each metric value is associated with two locations, which, in this example, are in two distinct files. The locations associated with each metric instance could also indicate different locations within a same source code file.

The "a" metric instance 302 has a value of 1 and is associated with two files represented by the "main.c" node 326 and the "mylib.c" node 312. The "b" metric instance 304 has a value of 1 and is associated with two files represented by the "test1.c" node 322 and the "mylib.c" node 312.

The metric instances 302 and 304 may represent duplicate functions in the code base. Thus, the "a" metric instance 302 may represent that the file "main.c" and the file "mylib.c" include a duplicate function. Other attributes that may result in a metric instance being associated with multiple locations in a code base include cyclomatic complexity of a function, which can be associated with both the declaration of the function in one file and the definition of the function in another file, and a number of files modified by a particular commit of source code to the code base.

As shown in FIG. 2, the system computes, for each parent node, a union of metric instances associated with the node and metric instances associated with nodes descendant from the parent node (240). To compute an attribute value that accurately describes duplicate functions in the code base, a system cannot merely aggregate the metric values of metric instances associated with each file in the code base. Because each of the duplicate function metric instances is associated with multiple files, simple aggregation, in which the value associated with each parent node is an aggregated value computed from values associated with the parent node's children, may result in double counting some metric values. For example, computing an aggregated sum for a parent node, where the sum is computed as a sum of aggregated attribute values of the parent node's children, can result in double counting.

Instead, the system can compute a set of metric instances at each node, in which each identifier of a metric instance occurs in the set no more than once. Generally, for a particular node the system computes a set union that includes metric instances associated the particular node with metric instances associated with nodes descendant from the particular node in the graph. Thus, if the graph represents files and directories, the system can compute a set union that includes metric instances associated with a file or directory represented by the particular node with metric instances associated with files or directories represented by nodes descendant from the particular node in the display graph. Thus, the system can compute a set of metric instances for a node as a union of sets, the union containing all identifiers of metric instances included in sets associated with the node itself and nodes descendant from the node.

Figure 3B:
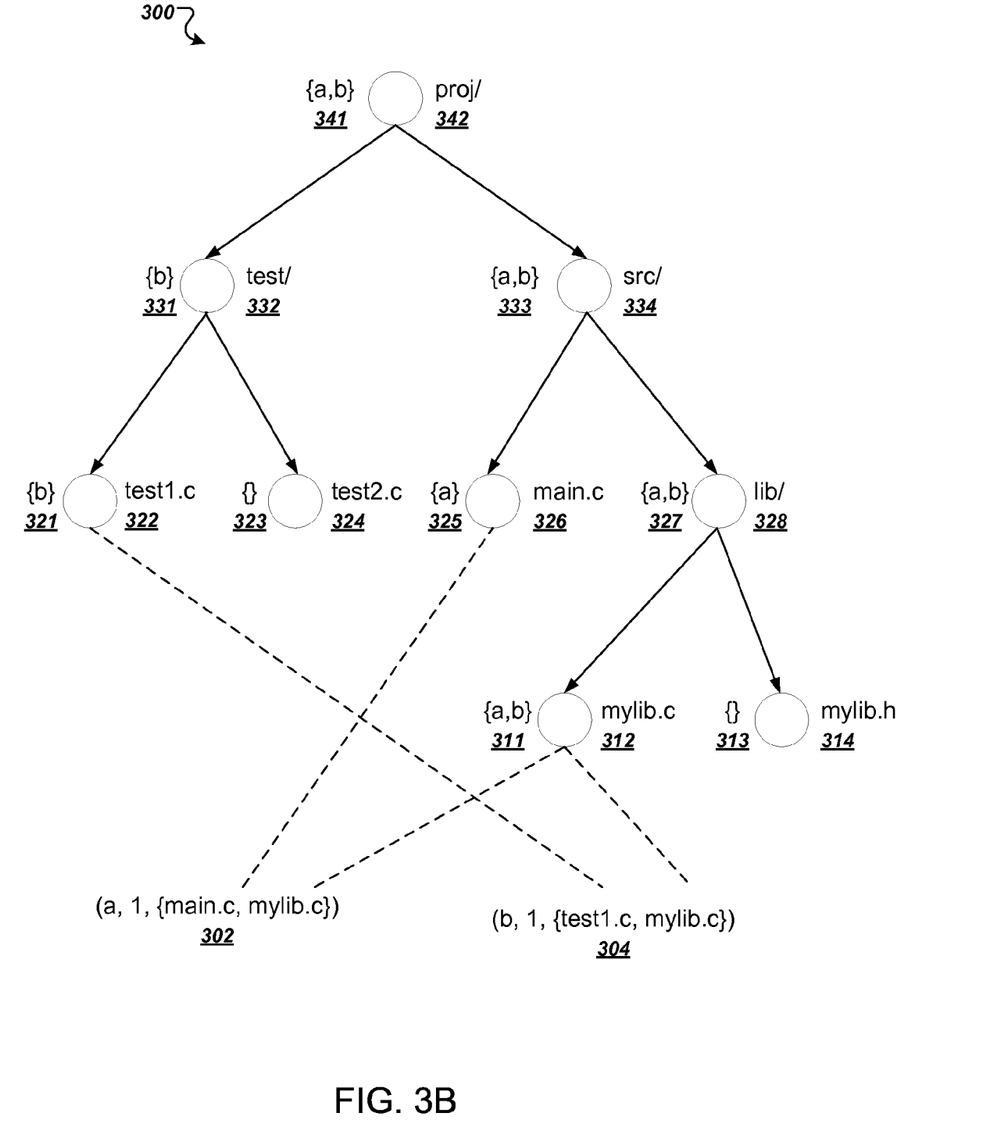
FIG. 3B illustrates set unions of metric instances associated with nodes in the display graph.

FIG. 3B illustrates set unions of metric instances associated with nodes in the display graph 300. The system can compute the set unions in a bottom-up fashion, starting at the leaf nodes. For example, the system can compute the set 311 for the "mylib.c" node 312 using metric instances associated with the file "mylib.c." Thus, the set 311 includes identifiers for both the "a" metric instance 302 and the "b" metric instance 304. The file "mylib.h" is not associated with any metric instances, so the set 313 is empty. The set 325 includes an identifier only for the "a" metric instance 302 because the file "main.c" represented by the node 326 is associated only with the "a" metric instance 302.

The system computes a set union for the set 327. The union of the set 311 and the set 313 is {a,b}, which includes identifiers for both the "a" metric instance 302 and the "b" metric instance 304. The system then computes a set union for the set 333. The union of {a} for the set 325 and {a,b} for the set 327 is {a,b}.

The set 321 includes an identifier only for the "b" metric instance 304 because the file "test1.c" represented by the node 322 is associated only with the "b" metric instance 304. The set 323 is empty because the file "test2.c" is not associated with any metric instances.

The system computes a set union for the set 331, resulting in {b}. The system then computes the set union for the set 341 associated with the root "proj/" node 342, resulting in {a,b}.

As shown in FIG. 2, the system computes, for a parent node, an attribute value using metric values of metric instances in the union of metric instances associated with the parent node (250). After computing the unions of sets for each node in the display graph, the system can aggregate metric values associated with metric instances in the union.

For example, for the root "proj/" node 342 in FIG. 3B, the system can compute an attribute value by aggregating metric values of metric instances in the set 341, or {a,b}. In other words, the system can compute the attribute value using metric values associated with the "a" metric instance 302 and the "b" metric instance 304. The attribute value for "duplicate functions" for the code base is thus 2, which is the correct number of duplicate functions in the code base.

Some types of aggregated metric values are computed using attribute values of multiple sets of metric instances. For example, the system can compute an arithmetic mean of the number of duplicate functions associated with source code files in the project using an aggregated duplicate function count and an aggregated source code file count. The system can first compute a duplicate function count of metric values associated with the "a" metric instance 302 and the "b" metric instance 304, which is 2. The system can then compute a source code file count using a metric type that assigns a value of 1 to source code files and 0 to directories or other types of nodes in the display graph. In FIG. 3B, the source code file count is 5. The system can then compute the aggregated arithmetic mean by dividing the duplicate function count by the source code file count.

The system provides display graph information including the computed attribute value (260). In response to the request, the system can provide the attribute value for the node corresponding to the requested portion of the code base. In some implementations, the system can provide a presentation for display in a user interface of a user device, e.g., a presentation that includes a graphical representation of the display graph.

Figure 4:
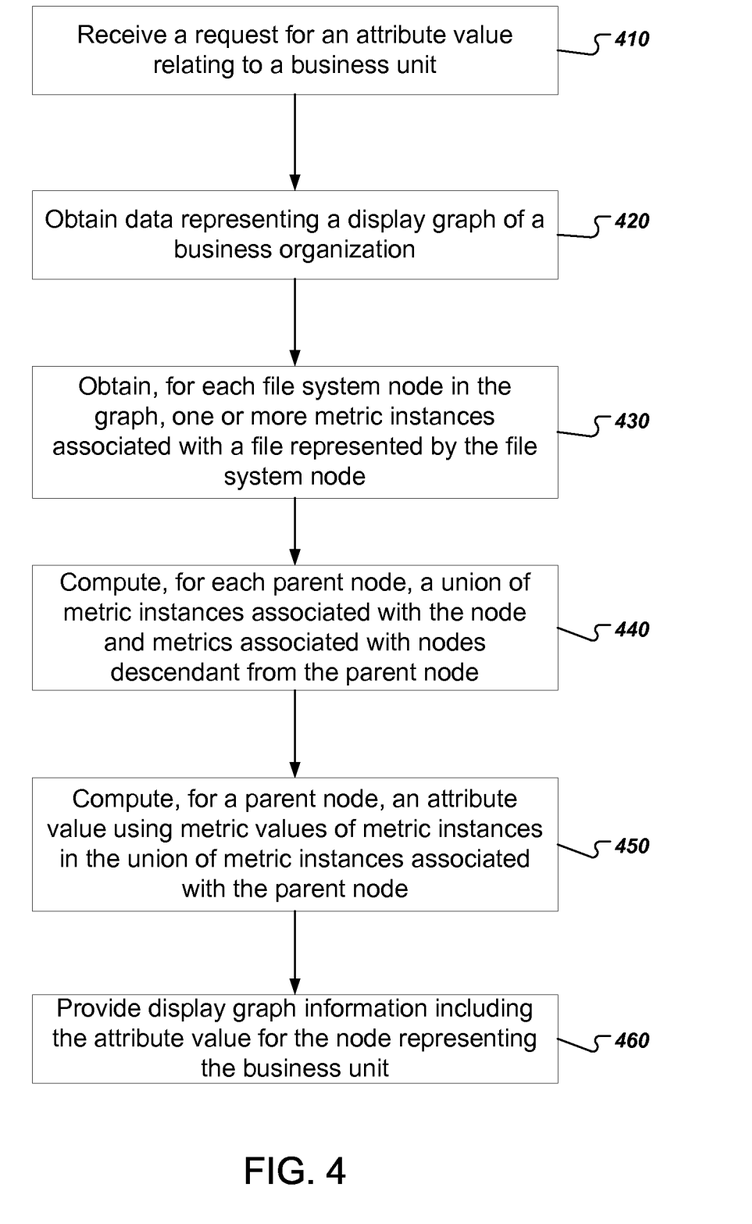
FIG. 4 is a flow chart of an example process for aggregating metric values of shared metric instances.

FIG. 4 is a flow chart of an example process for aggregating metric values of shared metric instances. A shared metric instance is a metric instance that is associated with a node in a display graph that is reachable by multiple paths in the graph. Thus, multiple parent nodes may share responsibility for the metric instance. Shared metric instances can occur in display graphs that represent the structure of business organizations. The process will be described as being performed by an appropriately programmed system of one or more computers, e.g., the aggregation engine 110 of FIG. 1.

The system receives a request for an attribute value relating to a business unit (410). A user may request an attribute value for source code owned by a particular business unit of a business organization. For example, a user can request a value for the attribute "number of lines of code" for which the business unit is responsible.

The system obtains data representing a display graph of a business organization (420). A display graph representing a business organization can help the user or management of an organization to gain insight into the performance of various units of the business. In particular, the organizational nodes representing business units can have edges to any arbitrary portion of the code base. Thus, responsibility within the business organization represented by the display graph is not constrained by any particular file system structure in the code base.

In addition, multiple business units can have overlapping responsibility within a code base. The display graph can represent that two business units have responsibility for a particular part of the code base.

The responsibilities represented by the display graph may also be partially overlapping. In other words, one business unit may have partial responsibility for a small portion of the code base that is part of a larger portion for which another business unit has responsibility.

Figure 5A:
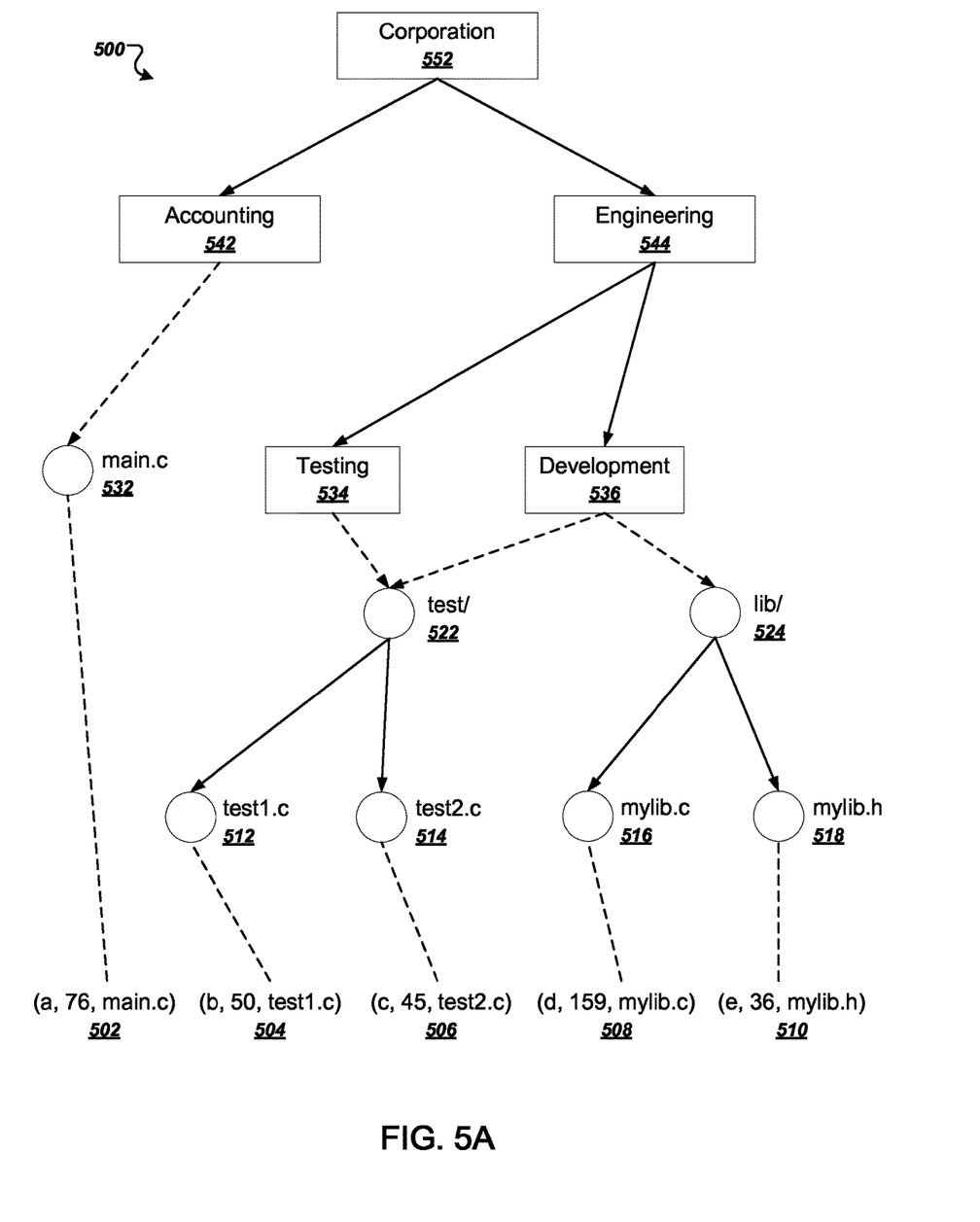
FIG. 5A illustrates an example display graph representing the structure of a business organization.

FIG. 5A illustrates an example display graph 500 representing the structure of a business organization. For example, the display graph 500 can represent the responsibilities of business units in a business organization.

The Corporation node 552 represents an overall business organization. The edges from the Corporation node 552 to the Accounting node 542 and the Engineering node 544 represent responsibility by the business organization for the accounting and engineering units. Similarly, the Engineering node 544 has edges to a Testing node 534 and a Development node 536, which represent responsibility by the engineering unit for testing and development units of the business organization.

The organizational nodes that represent business units can be mapped to portions of the code base. For example, the Testing node 534 has an edge to a file system node, the "test/" node 522. The edge represents that a business unit, the testing unit, has responsibility for a portion of the code base that resides in a directory represented by the "test/" node 522.

The Development node 536 also has an edge to the "test/" node 522. This edge represents that another business unit, the development unit, also has responsibility for the portion of the code base that resides in the directory represented by the "test/" node 522. Thus, the "test/" node 522 is reachable by multiple paths in the display graph 500.

The "test/" node 522 has edges to the "test1.c" node 512 and to the "test2.c" node 514, which instead of business responsibility, represent directory inclusion of files represented by the nodes 512 and 514 in the directory represented by the "test/" node 522. Thus, the display graph 500 includes multiple types of nodes: organizational nodes and file system nodes, as well as multiple types of edges: representing business responsibility and representing directory inclusion.

Similarly, the Accounting node 542 has an edge to the "main.c" node 532, a file system node. Thus, the business unit represented by the Accounting node 542 has direct responsibility for a particular file of the code base, main.c, rather than a directory.

The Development node 536 also has an edge to the "lib/" node 524, and the "lib/" node 524 has edges representing directory inclusion to the node "mylib.c" 516 and the node "mylib.h" 518.

As shown in FIG. 4, the system obtains, for each file system node in the graph, one or more metric instances associated with a file represented by the file system node (430). Typically, metric instances are initially associated with source code files represented by file system nodes in the display graph. However, business units may also be associated with metric instances associated with files in the source code base.

In FIG. 5A, for example, the "a" metric instance 502 is associated with the "main.c" node 532, the "b" metric instance 504 is associated with the "test1.c" node 512, the "c" metric instance 506 is associated with the "test2.c" node 514, the "d" metric instance 508 is associated with the "mylib.c" node 516, and the "e" metric instance 510 is associated with the "mylib.h" node 518.

As shown in FIG. 4, the system computes, for each parent node, a union of metric instances associated with the node and metric instances associated with nodes descendant from the parent node (440). In a graph that is not a tree, the system cannot merely aggregate metric values up the graph because the metric values of some metric instances will be counted twice.

Thus, the system can instead compute a set union of metric instances at each node, which includes identifiers for metric instances associated with the node as well as identifiers for metric instances associated with nodes descendant from the node, as described above with reference to FIG. 2.

Figure 5B:
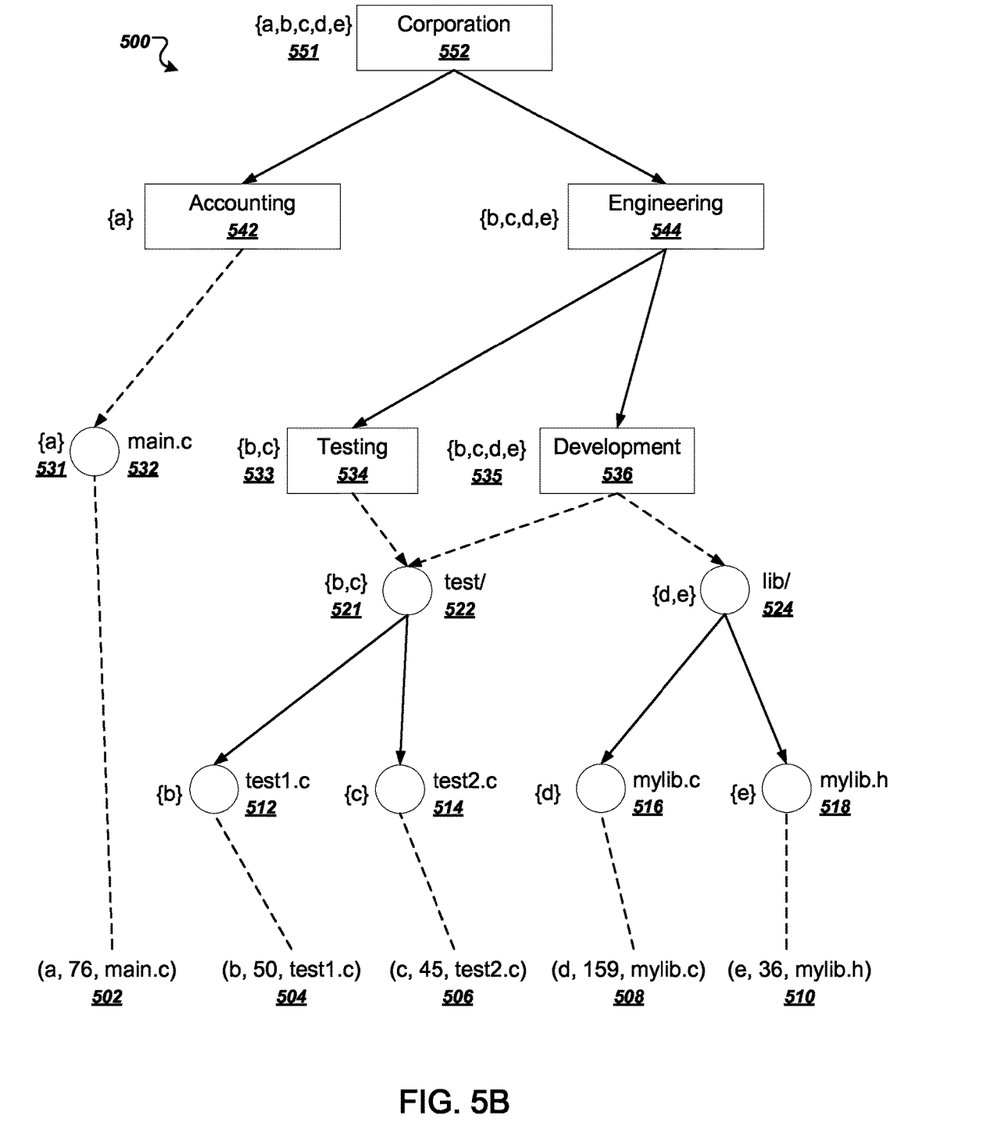
FIG. 5B illustrates set unions of metric instances associated with nodes in the display graph.

FIG. 5B illustrates set unions of metric instances associated with nodes in the display graph 500. The system can compute the set unions in a bottom-up fashion, starting with leaf nodes of the display graph 500, as described in more detail above with reference to FIG. 3B.

The "test/" node 522 is reachable by multiple paths in the display graph 500. Thus, the set 521 will contribute identifiers of metric instances to the sets of multiple parent nodes. In particular, the set 521 for the "test/" node 522 contributes all of its identifiers of metric instance to the sets for both parent nodes, e.g., both the Testing node 534 and the Development node 536. All of the identifiers in the set 521 will thus also occur in both the set 533 as well as the set 535.

After computing all of the set unions, the root Corporation node 552 has an associated set 551 which includes identifiers for each of the metric instances 502, 504, 506, 508, and 510.

The system may pre-aggregate some metric values for metric instances that are associated with a particular file. For example, the value 76 associated with "a" metric instance 502 may actually represent an aggregated metric value for multiple metric instances associated with the "main.c" source code file. Thus, instead of the system aggregating the metric values of all metric instances in the system in response to a single request, some metric values can be pre-aggregated and associated as attributes values for the appropriate file or business unit node in the display graph. For example, the system can pre-aggregate the metric value for the "a" metric instance 502, and the system can then associate the set 531 with the "main.c" node 532 before the system receives a request for attribute values for the "main.c" node 532 or any of its parent nodes.

The system can also pre-aggregate attribute values that rely on different types of aggregated metric values. For example, the system can compute a pre-aggregated arithmetic mean of lines of source code in source code files in a particular directory using a pre-aggregated value for the sum of lines of source code of files in the directory and a pre-aggregated value for the count of source code files in the particular directory.

However, in some cases, the system cannot further propagate pre-aggregated values for non-associative operations, e.g., an arithmetic mean. Rather, the system should propagate pre-aggregated values for only associative operations, e.g., the sum of lines of source code files and the count of source code files in the directory.

As shown in FIG. 4, the system computes, for a parent node, an attribute value using metric values of metric instances in the union of metric instances associated with the parent node (450).

For example, for the root Corporation node 551, the system can compute an attribute value using metric values of metric instances in the set 551, or {a, b, c, d, e}. The attribute value is 76+50+45+159+36=366, which is the correctly aggregated value of all metric values for all metric instances associated with nodes in the display graph 500.

The attribute value for the Development node 536 is 50+45+159+36=290, and the attribute value for the Testing node 534 is 50+45=95. Thus, the metric values of the metric instances 504 and 506 contributed to both the attribute value for the Testing node 534 and the attribute value for the Development node 536.

The system provides display graph information including the attribute value for the node representing the business unit (460). For example, if the user requested information for a particular attribute of source code for which the engineering business unit is responsible, the system can provide the attribute value computed for the Engineering node 544. As described above, responding to the request may include the system providing a graphical representation of the display graph to a user.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA or an ASIC.

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    obtaining data representing a directed graph, wherein one or more nodes of the graph are associated with a respective set of one or more metric instances, wherein each respective set of metric instances for each node in the graph identifies all metric instances associated with the node and all metric instances associated with any node descendant from the node in the graph, wherein each metric instance identifies a location in a source code base, and wherein each metric instance has a respective metric value, and wherein at least one node is reachable by multiple paths in the graph,
    wherein the graph includes multiple source code location nodes and multiple edges between the source code location nodes, each source code location node representing a portion of the source code base, each edge between source code location nodes representing inclusion of a first portion of the source code base in a second portion of the source code base,
    wherein the graph includes multiple organizational nodes and multiple edges, each organizational node representing a respective business entity of a business organization, each edge between organizational nodes representing responsibility of a first business entity for a second business entity, wherein each edge between an organizational node and a source code location node represents responsibility of a business entity represented by the organizational node for a portion of the source code base represented by the source code location node; and
    computing an aggregated attribute value for a first node in the graph, including aggregating respective metric values of each metric instance in a first set of metric instances associated with the first node,
    wherein the first set of metric instances identifies all metric instances associated with the first node and all metric instances associated with any node descendant from the first node in the graph including the node reachable by multiple paths in the graph.

2. The method of claim 1, further comprising computing the first set of metric instances associated with the first node as a set union of one or more sets of metric instances associated with any node directly descendant from the first node in the graph.

3. The method of claim 2, wherein at least one metric instance is associated with multiple locations in the source code base, the multiple locations being represented by multiple source code location nodes in the graph, and wherein computing the first set of metric instances associated with the first node comprises including the metric instance associated with multiple locations in the source code base in the first set of metric instances only once.

4. The method of claim 1, further comprising computing respective sets of metric instances for each of multiple parent nodes of the node reachable by multiple paths in the graph including adding all the metric instances associated with the node to each respective set of metric instances of the multiple parent nodes.

5. The method of claim 1, wherein each source code location node represents a location in a file system.

6. The method of claim 1, wherein the first node is an organizational node representing a particular business entity.

7. The method of claim 6, wherein the node reachable by multiple paths in the graph represents a source code location node.

8. The method of claim 7, wherein the node reachable by multiple paths in the graph represents a portion of the source code base for which multiple business entities have responsibility.

9. A system comprising:
    one or more computers and one or more storage devices storing instructions that are operable, when executed by the one or more computers, to cause the one or more computers to perform operations comprising:
    obtaining data representing a directed graph, wherein one or more nodes of the graph are associated with a respective set of one or more metric instances, wherein each respective set of metric instances for each node in the graph identifies all metric instances associated with the node and all metric instances associated with any node descendant from the node in the graph, wherein each metric instance identifies a location in a source code base, and wherein each metric instance has a respective metric value, and wherein at least one node is reachable by multiple paths in the graph,
    wherein the graph includes multiple source code location nodes and multiple edges between the source code location nodes, each source code location node representing a portion of the source code base, each edge between source code location nodes representing inclusion of a first portion of the source code base in a second portion of the source code base,
    wherein the graph includes multiple organizational nodes and multiple edges, each organizational node representing a respective business entity of a business organization, each edge between organizational nodes representing responsibility of a first business entity for a second business entity, wherein each edge between an organizational node and a source code location node represents responsibility of a business entity represented by the organizational node for a portion of the source code base represented by the source code location node; and
    computing an aggregated attribute value for a first node in the graph, including aggregating respective metric values of each metric instance in a first set of metric instances associated with the first node,
    wherein the first set of metric instances identifies all metric instances associated with the first node and all metric instances associated with any node descendant from the first node in the graph including the node reachable by multiple paths in the graph.

10. The system of claim 9, wherein the operations further comprise computing the first set of metric instances associated with the first node as a set union of one or more sets of metric instances associated with any node directly descendant from the first node in the graph.

11. The system of claim 10, wherein at least one metric instance is associated with multiple locations in the source code base, the multiple locations being represented by multiple source code location nodes in the graph, and wherein computing the first set of metric instances associated with the first node comprises including the metric instance associated with multiple locations in the source code base in the first set of metric instances only once.

12. The system of claim 9, wherein the operations further comprise computing respective sets of metric instances for each of multiple parent nodes of the node reachable by multiple paths in the graph including adding all the metric instances associated with the node to each respective set of metric instances of the multiple parent nodes.

13. The system of claim 9, wherein each source code location node represents a location in a file system.

14. The system of claim 9, wherein the first node is an organizational node representing a particular business entity.

15. The system of claim 14, wherein the node reachable by multiple paths in the graph represents a source code location node.

16. The system of claim 15, wherein the node reachable by multiple paths in the graph represents a portion of the source code base for which multiple business entities have responsibility.

17. A computer program product, encoded on one or more non-transitory computer storage media, comprising instructions that when executed by one or more computers cause the one or more computers to perform operations comprising:

obtaining data representing a directed graph, wherein one or more nodes of the graph are associated with a respective set of one or more metric instances, wherein each respective set of metric instances for each node in the graph identifies all metric instances associated with the node and all metric instances associated with any node descendant from the node in the graph, wherein each metric instance identifies a location in a source code base, and wherein each metric instance has a respective metric value, and wherein at least one node is reachable by multiple paths in the graph, wherein the graph includes multiple source code location nodes and multiple edges between the source code location nodes, each source code location node representing a portion of the source code base, each edge between source code location nodes representing inclusion of a first portion of the source code base in a second portion of the source code base, wherein the graph includes multiple organizational nodes and multiple edges, each organizational node representing a respective business entity of a business organization, each edge between organizational nodes representing responsibility of a first business entity for a second business entity, wherein each edge between an organizational node and a source code location node represents responsibility of a business entity represented by the organizational node for a portion of the source code base represented by the source code location node; and computing an aggregated attribute value for a first node in the graph, including aggregating respective metric values of each metric instance in a first set of metric instances associated with the first node, wherein the first set of metric instances identifies all metric instances associated with the first node and all metric instances associated with any node descendant from the first node in the graph including the node reachable by multiple paths in the graph.

\* \* \* \* \*

UNITED STATES PATENT AND TRADEMARK OFFICE
CERTIFICATE OF CORRECTION

| | | |
|---|---|---|
| PATENT NO. | : 9,619,224 B2 | Page 1 of 1 |
| APPLICATION NO. | : 14/794227 | |
| DATED | : April 11, 2017 | |
| INVENTOR(S) | : Julian Tibble et al. | |

It is certified that error appears in the above-identified patent and that said Letters Patent is hereby corrected as shown below:

On the Title Page

Column 1, "(72) Inventors:" after "Arthur Baars, Oxford (GB)", insert --; Anders Starcke Henriksen, Oxford (GB)--.

Signed and Sealed this
Thirteenth Day of August, 2019

Andrei Iancu
*Director of the United States Patent and Trademark Office*